3,169,974
THIETANE PHOSPHORUS ESTERS
Gustave K. Kohn, Berkeley, Calif., assignor to California
Research Corporation, San Francisco, Calif., a corporation of Delaware
No Drawing. Filed July 31, 1962, Ser. No. 213,593
5 Claims. (Cl. 260—327)

This invention relates to novel organic phosphorus compounds, their novel pesticidal compositions, and their use as pesticides. More particularly, this invention relates to novel organic phosphorus compounds having the thietanyl radical, their novel pesticidal compositions and their use as pesticides.

The compounds of this invention are phosphorus compounds of the general formula

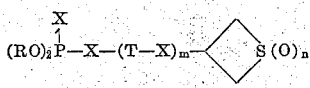

where R is lower alkyl, that is, of from 1 to 6 carbons, X is chalcogen, i.e., oxygen and sulfur, T is alkylene of from 1 to 3 carbons, $m$ is 1 and $n$ is a cardinal number and varies from 0 to 2.

The X's in the above formula may be the same or different. When the X's are different, the formula is best defined as

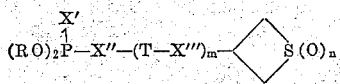

where R, T, $m$ and $n$ are defined as previously designated and X', X" and X''' are either oxygen or sulfur. The preferred compounds of this invention are those in which X' is sulfur and particularly preferred compounds are those in which X is sulfur, that is, X', X" and X''' are all sulfur.

R may be methyl, ethyl, n-propyl, isopropyl, n-butyl, isobutyl, n-hexyl, 3-hexyl, etc., but it is preferred that R be of not more than 3 carbons. T may be methylene, ethylene, 1,2-propylene, trimethylene, isopropylidene, etc. It is preferred, however, that T be methylene or polymethylene, particularly polymethylene of 2 carbons.

Illustrative of the scope of this invention are the following novel compounds.

Among compounds having an alkylene bridge are the following: O,O-diethyl O-(3-thietanylthio)methyl phosphate; O,O-dimethyl S-[3-(thietanylthio)methyl] phosphorodithioate; O,O-dipropyl S-[2-(3-thietanylthio)ethyl] phosphorodithioate; O,O-diethyl S-[2-(3-thietanyloxy)-ethyl] phosphorodithioate; O,O-dimethyl S-[2-(1,1-dioxy-3-thietanylthio)ethyl] phosphorodithioate; O,O-dimethyl O-[3-(3-thietanylthio)-propyl] phosphorothioate; O,O-diethyl S-[2-(3-thietanylthio)propyl] phosphorodithioate; etc.

The compounds of this invention may be prepared in a variety of ways. A 3-halothietane may be used with the salt of the desired phosphate or thiophosphate radical. On the other hand, the salt of the alcohol or mercaptan derivative of the thietane may be treated with the proper phosphorochlorido derivative. The choice of the method of preparation will depend on the ease of preparation or availability of the precursors.

The reactions will usually be run at relatively mild temperatures. The temperatures will usually be in the range of 0° to 100° C., depending upon the particular method used for the synthesis. The solvents may be varied widely, as long as they are inert to the reactants and products. Solvents such as acetone, ether, benzene, and mixtures thereof, are found to be operative. In most instances, the reaction merely requires the bringing together of the various reactants in a suitable solvent and isolating the resulting product by methods well known in the art.

The following examples serve to illustrate desirable methods for preparing the compounds of this invention. However, their limitation to any specific method is not intended.

EXAMPLE I

Into a reaction vessel equipped with reflux condenser, agitator, thermometer, and dropping funnel was introduced 22.5 parts of 2-(3-thietanylthio)-ethanol (0.15 mole), 18 parts of sodium carbonate (0.17 mole), and 120 parts of acetone. The mixture was heated to 50° C. and 25.5 parts of diethyl phosphorochloridate was added over a period of 10 minutes, followed by heating to reflux for 2.5 hours. The reaction mixture was cooled and filtered and the filter cake washed with acetone. The combined filtrate and washings was stripped to reduced pressure to an ultimate temperature of 85° C. at 0.1 mm. pressure. There remained 38 parts of diethyl 2-(3-thietanylthio)ethyl phosphate.

Analysis:

| | Theory, percent | Found, percent |
|---|---|---|
| S | 22.4 | 23.2 |
| P | 10.82 | 10.95 |

EXAMPLE II

Into a reaction vessel described in Example I was introduced 8 parts of sodium hydride dispersion (0.166 mole) and 132 parts of benzene. To this mixture was added 22.5 parts of 2-(3-thietanylthio) ethanol (0.15 mole). After addition, the stirred mixture was heated to reflux for one hour. The mixture was then cooled, allowed to settle and the supernatant liquid removed by suction. The remaining salt was washed three times with benzene to remove the dispersion oil from the sodium hydride. To the salt was then added 132 parts of benzene followed by 24 parts of O,O-dimethyl phosphorochloridothioate (0.15 mole) by dropwise addition. The reaction mixture was heated to reflux for three hours, cooled and filtered. The filter cake was washed with ether and the combined filtrate and washings stripped at reduced pressure to an ultimate temperature of 80° C. at 0.04 mm. pressure. The residue was triturated with acetone and solid material filtered off. The solvent was stripped off leaving 7 parts of O,O-dimethyl O-(3-thietanylthio) ethyl phosphorothioate.

| | Theory, percent | Found, percent |
|---|---|---|
| P | 11.29 | 11.28 |
| S | 35.00 | 30.2 |

Except where otherwise indicated, parts are intended to be by weight.

The compounds of the following table were prepared according to the methods described in Example I.

Table I

| Structure | Analysis | | | |
|---|---|---|---|---|
| | S | | P | |
| | Percent Calc. | Percent Found | Percent Calc. | Percent Found |
| $CH_3O$\P-O-CH$_2$-CH$_2$-S-◇S / $CH_3O$ (S) | | | 11.28 | 11.23 |
| $C_2H_5O$\P-O-CH$_2$-CH$_2$-S-◇S / $C_2H_5O$ (S) | 31.8 | 31.9 | 10.2 | 9.1 |
| $CH_3O$\P-O-CH$_2$-CH$_2$-S-◇S / $CH_3O$ (O) | 24.8 | 25.5 | | |
| $C_2H_5O$\P-O-CH$_2$-CH$_2$-S-◇S / $C_2H_5O$ (O) | 22.5 | 23.2 | 10.8 | 10.9 |
| $C_2H_5O$\P-S-CH(CH$_3$)-CH$_2$-S-◇S / $C_2H_5O$ (S) | 38.5 | 37.5 | 9.3 | 10.7 |

The compounds of this invention show a broad range of pesticidal activity. These compounds have significant biocidal activity against a variety of insects and mites as well as other pests. Moreover, the compounds also show a high degree of systemic activity.

In order to demonstrate the biological activity of the novel thietane derivatives, the following tests were carried out.

Fordham lima beans and national pickling cucumber were planted using U.C. mix. After 14 days the plants were ready to be tested. A stock solution of the desired thietane derivative was prepared, consisting of 320 mg. per 16 ml. of acetone and 20 drops of a mixture containing 95% xylene and 5% Toximul 600. Five ml. of solution were mixed with 15 ml. of fine vermiculite to be used per one 4" x 15" x 3" flat of soil. Before the vermiculite was applied to the plant, all the acetone was allowed to evaporate.

The vermiculite dressing was introduced around the plant. Three of the indicated flats were used per dilution. After 7 days the plants were infested with the appropriate pest and the rate of mortality was determined 48 hours after infestation. At a dosage of 160 mg. per row foot, O,O-diethyl O-(3-thietanyl) phosphate gave 96% control of two-spotted mites.

The contact activity of the novel thietanes was determined as the $LD_{50}$, the lethal dosage for a 50% kill, against mites and aphids. In determining the $LD_{50}$, triplicate 0.5 ml. discs of lima bean leaves are infested each with 20 mites or 20 aphids, respectively, and dipped in acetone-toxicant solution diluted to provide a range of 100, 30, 10, 3 and 1 p.p.m. of toxicant. The excess liquid is shaken off and the leaves are placed on filter paper in standard Petri plates wherein they are dried with a mild stream of warm air and then covered for 24 hours at room temperature. The $LD_{50}$ is obtained by plotting the percent mortality for each replicated concentration on two-cycle logarithm probit paper.

The results of these tests are shown in the following table:

Table II

| Structure | $LD_{50}$ (p.p.m.) | |
|---|---|---|
| | Mites (*Tetrancyhis telamis* L.) | Aphids (*Aphis gossypii* Gl.) |
| $C_2H_5O$\P-O-CH$_2$-CH$_2$-S-◇S / $C_2H_5O$ (O) | ~10 | ~10 |

The data clearly demonstrates that the novel thietane derivatives show systemic and contact activity toward a wide variety of pests.

Aside from the specific formulation and application of the class of compounds of this invention as represented by the foregoing test, these compounds may be dispersed in or upon other inert liquid and solid carriers such as inert clay, xylenes, etc. The solid carriers may be in the form of a dust, or used in conjunction with a suitable wetting agent from a wettable powder. The pesticidal compounds of this invention may also be formulated with other solvents, dispersing agents, or emulsifying agents. Further, these compounds may not only be applied alone or admixed with other compounds of the disclosed class, but also may be used in combination with other active toxicants in the formulation of pesticidal compositions.

The compounds may be applied to any environmental area which is a host to various insects or mites or susceptible to their attack. For example, the compositions may be sprayed or otherwise applied directly to a plant or other host, may be applied to the plant seed, sprayed upon the soil or other plant environment or used in similar ways so as to affect the control of the pests.

As will be evident to those skilled in the art, various modifications on this process can be made or followed, in the light of the foregoing disclosure and discussion, without departing from the spirit or scope of the disclosure or from the scope of the following claims.

I claim:
1. Compound of the formula

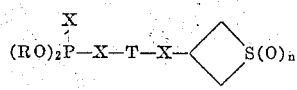

wherein R is lower alkyl, X is chalcogen, T is dimethylene, and $n$ is a cardinal number in the range of 0 to 2.
2. O,O-diethyl O-[2-(3-thietanylthio)ethyl] phosphorothioate.
3. O,O-diethyl O-[2-(3-thietanylthio)ethyl] phosphate.
4. O,O - dimethyl O-[2-(3-thietanylthio)ethyl]phosphate.
5. O,O - dimethyl O-[2-(3-thietanylthio)ethyl] phosphorothioate.

References Cited in the file of this patent
UNITED STATES PATENTS

| 2,861,919 | Gilbert | Nov. 25, 1958 |
| 2,958,624 | Bimber | Nov. 1, 1960 |
| 3,041,350 | McConnell et al. | June 26, 1962 |
| 3,053,852 | Coover et al. | Sept. 11, 1962 |
| 3,071,594 | Enders et al. | Jan. 1, 1963 |